US008210325B2

(12) United States Patent
Cao et al.

(10) Patent No.: US 8,210,325 B2
(45) Date of Patent: Jul. 3, 2012

(54) DISK BRAKE WITH AN IMPROVED STRUCTURE

(75) Inventors: Jianwen Cao, Changshu (CN); He Zhang, Changshu (CN); Wenna Fang, Changshu (CN); Yesheng Qu, Changshu (CN); Wei Zhou, Changshu (CN)

(73) Assignee: Suzhou Torin Drive Equipment Co., Ltd., Jiangsu (CN)

( * ) Notice: Subject to any disclaimer, the term of this patent is extended or adjusted under 35 U.S.C. 154(b) by 440 days.

(21) Appl. No.: 12/506,772

(22) Filed: Jul. 21, 2009

(65) Prior Publication Data

US 2010/0122876 A1 May 20, 2010

(30) Foreign Application Priority Data

Nov. 19, 2008 (CN) .......................... 2008 1 0235986

(51) Int. Cl.
*F16D 65/52* (2006.01)
*F16D 65/38* (2006.01)

(52) U.S. Cl. .................... 188/71.8; 188/171; 188/196 P

(58) Field of Classification Search ................. 188/71.7, 188/71.8, 196 R, 196 P, 196 V, 161, 166, 188/171, 173

See application file for complete search history.

(56) References Cited

U.S. PATENT DOCUMENTS

| | | | | |
|---|---|---|---|---|
| 5,186,286 | A * | 2/1993 | Lindberg | 188/171 |
| 7,438,162 | B2 * | 10/2008 | Eiband | 188/171 |

FOREIGN PATENT DOCUMENTS

| | | | |
|---|---|---|---|
| CN | 1833117 | A | 9/2006 |
| WO | WO 2005/003583 | A1 | 1/2005 |

* cited by examiner

*Primary Examiner* — Thomas J Williams

(74) *Attorney, Agent, or Firm* — Christie, Parker & Hale, LLP

(57) ABSTRACT

A disk brake comprising: a brake disk, a moving disk, a fixed disk, a mounting base, a guide rod, a fixed rod, first and second levers, a fixed plate, and first and second spring clamps. Here, one end of the fixed rod is fixed to a plane of the moving disk, the other end of the fixed rod passes through the fixed disk and is fixed to one end of the first/second lever, and the other end of the first/second lever is fixed to the circumferential surface of the fixed disk on the center line of the fixed disk; the fixed plate is fixed to either the guide rod or the mounting base; one end of the first/second spring clamp is connected to the fixed plate, and the other end of the first/second spring clamp is clamped at the middle position between the first and second levers.

8 Claims, 7 Drawing Sheets

DISK BRAKE WITH AN IMPROVED STRUCTURE

CROSS-REFERENCE TO RELATED APPLICATION

This application claims priority to and the benefit of Chinese Patent Application No. 200810235986.5, filed in the Chinese Intellectual Property Office on Nov. 19, 2008, the entire contents of which are incorporated herein by reference.

FIELD OF THE INVENTION

The following description relates to a magnetic brake, in particular to a disk brake for an elevator traction machine, and an improved structure for the disk brake.

BACKGROUND OF THE INVENTION

In the prior art, a disk brake can be applied on a traction machine of an elevator, with its structure shown in FIG. 1 and FIG. 2. It comprises a brake disk (1), a moving disk (2), a fixed disk (3), left and right friction plates (15, 16), a brake coil (4), a brake spring (5), a bolt (6), a spring bulkhead (7), a small spring (8), a guide rod (9), a sleeve (10), a first locknut (11), an adjusting bolt (12), a mounting base (13), and a brake calipers (14); wherein, the brake coil (4) and brake spring (5) are arranged in the fixed disk (3); the brake calipers (14) are fixed to the fixed disk (3) with screws; the moving disk (2) and the fixed disk (3) are connected in series in a movable manner with bolts, and the working clearance between them is adjusted to be A; the left and right friction plates (15, 16) are on each side of the brake disk (1) and attached to the inner side of the moving disk (2) and brake calipers (14), respectively; a mounting hole is arranged on the brake calipers (14), the sleeve (10) is arranged in the mounting hole, and the guide rod (9) is inserted in the sleeve (10) and mounted on the mounting base (13); the small spring (8) and the spring bulkhead (7) are fitted over the front end of the guide rod (9) in sequence and fixed to the guide rod (9) with the bolt (6); the adjusting bolt (12) is screwed on the rear end of the brake calipers (14), the spacing between the head of the adjusting bolt (12) and the mounting plane of the mounting base (13) is adjusted to be A/2, and the adjusting bolt (12) is locked tight with the first locknut (11).

When the disk brake is in braking state (as shown in FIG. 1), the brake coil (4) is cut off from power, the brake spring (5) pushes the moving disk (2) so that the working clearance A is formed between the moving disk (2) and the fixed disk (3); meanwhile, the left and right friction plates (15, 16) at the inner side of the moving disk (2) and brake calipers (14) clamp the brake disk (1) to prevent the brake disk (1) from rotation. When the disk brake is to be released (as shown in FIG. 2), the brake coil (4) is charged, so that a magnetic circuit is formed in the working clearance A between the moving disk (2) and the fixed disk (3) and electromagnetic force is created, and thereby the moving disk (2) and the fixed disk (3) attract each other; during the process of moving under the attraction force, the brake calipers (14) drive the fixed disk (3) to move towards the mounting base (13) at the same time under the spring force of the small spring (8) on the front end of the guide rod (9); however, since the spacing between the adjusting bolt (12) on the rear end of the brake calipers (14) and the mounting plane of the mounting base (13) is only A/2, the brake calipers (14) can only drive the fixed disk (3) to move A/2 distance backwards; whereas, since the total working clearance is A, the moving disk (2) moves A/2 distance outwards; the final result of the movement is: the working clearance A is allocated between the two sides of the brake disk (1), so that the left and right friction plates (15, 16) at the inner side of the moving disk (2) and the brake calipers (14) are no longer clamping the brake disk (1), and therefore the brake disk (1) can rotate freely.

FIG. 3 is a reference diagram of the working state of the aforementioned disk brake when it is mounted on a traction machine, wherein the brake is fixed to a front cover (19) of the traction machine via the mounting base (13), and the brake disk (1) is connected to a traction wheel (18) of the traction machine and is fitted over a main shaft (17) of the traction machine.

The working state of the traction machine is: a steel rope is hung on the traction wheel (18), the elevator cabin is dragged to move up or down under the frictional force between the steel rope and the traction wheel (18); when the elevator lands on a floor and the door of the elevator cabin is opened, the disk brake is cut off from power and thereby clamps the brake disk (1) to realize braking; when normal operation of the elevator is required, the disk brake is charged and releases the brake disk (1), so that the brake disk (1) can rotate with the traction wheel (18) normally.

The working clearance A in the disk brake in such a structure is very small; according to the calculating formula of electromagnetic force:

$$F = \frac{S \times B^2}{8 \times \pi} \times 10^7 = 4SB^2 \times 10^5$$

$$B = \mu_0 \times H = \mu_0 \frac{N \times I}{L}$$

F—Electromagnetic force;

B—Magnetic induction intensity;

S—Cross-sectional area of magnet;

L—Length of the air clearance, i.e., working clearance A;

It can be seen from the above formula: the electromagnetic force is inversely proportional to the squared value of the air clearance; therefore, the smaller the air clearance is, the stronger the electromagnetic force will be. Compared with other types of brakes, when the same electromagnetic force is required, disk brakes can be manufactured in smaller size; in other words, disk brakes have an advantage of achieving high electromagnetic force. However, the small working clearance A causes some drawbacks as well: when the elevator cabin is hung onto the traction wheel (18) on the traction machine, the traction wheel (18) bears radial force F, which also acts on the main shaft (17) and thereby causes some bending deflection on the main shaft (17); as a result, the brake disk (1) results in inclination, and therefore the acting point of the disk brake has some displacement and inclination, following the inclination of the brake disk (1).

Here, the effect of displacement is mainly discussed: if the diameter of the brake disk (1) is large, the displacement will be comparable to the size of the working clearance A; since the brake is mounted on the front cover (19) of the traction machine and the mounting plane of the front cover (19) is fixed, the brake has to move along with the displacement of the braking point of brake disk (1), because the brake clamps the brake disk (1); as a consequence, the distance between the end face of the adjusting screw (12) on the rear end of the brake calipers (14) and the mounting plane of the mounting base (13) is no longer A/2; the change of the distance causes uneven distribution of the working clearance between the two sides of the brake disk (1) when the brake is in charged state, and the brake disk (1) will chafe the friction plate at one side and produce noise; when the chafed friction plate is worn to a certain degree, it cannot be used to realize effective braking, and therefore brings potential safety hazards. Moreover, commercial traction machines with disk brakes available in the market usually have to be debugged on site after the elevator cabin is hung onto the traction machine; however, the adjustment of the aforementioned clearance must be done by a professional technician; such adjustment work adds a big expense in the installation on after-sale service of products. Furthermore, the axial displacement of the brake disk (1) will vary with the load in the elevator cabin, and therefore the brake cannot be tuned up to the normal state.

In the Chinese Patent Publication No. CN100385134C, a caliper type brake with a releaser is disclosed. To release or center the caliper type brake relative to the brake disk, the technical scheme of the caliper type brake employs a twin-arm rocker rod/rocker frame, which is supported on a fixed pin shaft (i.e. the guide rod) in a revolvable manner; one tongue piece of the rocker rod is connected to the circumferential surface of an armature disk (i.e., the moving disk), and the other tongue piece is connected to the brake calipers. Specifically, when the brake releases, the rocker rod turns the displacement of the moving disk into the movement of the brake calipers in the reverse direction, so that the journey at each side of the brake disk is equal to half of the total clearance. However, as described above, when the brake is mounted on the traction machine and the load is attached to the main shaft of the traction machine, the main shaft will have some bending deflection and therefore cause some inclination on the brake disk; as a result, the brake disk has some horizontal displacement and inclination; when the brake is in braking state, since there is clearance between the guide rod and the sleeve, the brake will incline with the brake disk, and therefore the total clearance in the horizontal direction is smaller than A. When the brake is charged, the brake releases the brake disk; under the action of the rocker rod, the displacement of the moving disk is turned into the displacement of the brake calipers, and the brake is recovered to vertical state without inclination; however, since the brake disk is still kept with some inclination, the clearances formed by the brake calipers at the sides of the brake disk are uneven. During that process, the displacement of the brake calipers in vertical direction at different positions is not constant completely; instead, the displacement is half of the total journey of the brake calipers only when the brake calipers are in the middle position between the left and right friction plates. In addition, in a specific embodiment of that invention, one tongue piece of the rocker rod is fixed to the circumferential surface of the moving plate, while the other tongue piece is fixed to the upper part of the brake calipers; however, in such a caliper type brake, the clearance cannot be halved accurately between the two sides of the brake disk, due to the irrational fixing points of the rocker rod structure and uneven stress. Furthermore, when the bending deflection reaches to a certain degree, the clearance even cannot be allocated correctly.

SUMMARY OF THE INVENTION

An aspect of an embodiment of the present invention is directed toward a disk brake with an improved structure, which can adjust automatically in any state, and ensure even clearance at the sides of the brake disk in the middle point between the friction plates when the brake is in charged state, and thereby enhances safety of the braking system and brings maintenance and service convenience.

An embodiment of the present invention is attained as follows: a disk brake with an improved structure, comprises a brake disk, a moving disk, a fixed disk, a brake coil and a brake spring arranged in the fixed disk, a brake calipers fixed to the fixed disk, a left friction plate adhered to the inner side of the moving disk, a right friction plate adhered to the inner side of the brake calipers, a mounting base designed to fix to a traction machine, and a guide rod inserted in a mounting hole of the brake calipers and fixed to the mounting base; the disk brake is characterized in: it further comprises a fixed rod, a first lever and a second lever, a fixed plate, and a first spring clamp and a second spring clamp; wherein, one end of the fixed rod is fixed to the plane of the moving disk, the other end of the fixed rod passes through the fixed disk and is fixed to one end of the first/second lever, respectively, and forming a working clearance A between the moving disk and the fixed disk; the other end of the first/second lever is fixed on the circumferential surface of the fixed disk on the center line of the fixed disk, respectively; the fixed plate is fixed to either the guide rod or the mounting base; one end of the first/second spring clamp is connected to the fixed plate respectively, and the other end of the first/second spring clamp is clamped at the middle position between the first and second levers, respectively.

In one embodiment of the present invention, on the other end of the first/second spring clamp, a cambered boss is formed to fit tightly with the first and second levers, respectively.

The first and second levers according to one embodiment of the present invention are fabricated into an integral structure.

The first and second levers according to one embodiment of the present invention are fabricated into separate parts.

The fixed rod according to one embodiment of the present invention comprises a single rod, wherein, one end of the fixed rod is fixed to the center of the plane of the moving disk, and the other end of the fixed rod passes through the a center shaft hole of the fixed disk and is fixed to one end of the first/second lever, respectively.

The fixed rod according to one embodiment of the present invention comprises two rods, wherein, one end of the fixed rods is fixed to the center of the plane of the moving disk, and the other end of the fixed rods passes through the fixed disk and is fixed to one end of the first/second lever, respectively.

The fixed plate according to one embodiment of the present invention comprises one plate, which is fixed to the front end of the guide rod with fasteners.

The fixed plate according to one embodiment of the present invention comprises two plates, which are fixed to the extension end of the mounting base with a fastener, respectively.

Since embodiments of the present invention employ the aforementioned structure, the embodiments of the present invention provide the following enhancements: 1. By omitting, the small spring and adjusting screw in the prior art, the problem of adjusting screw colliding with the mounting plane of the mounting base frequently under the action of the small spring and thereby getting loose can be avoided; 2. A problem in the prior art of the brake disk having to be readjusted due to the displacement as a result of the bending deflection of the main shaft after the load is attached to the main shaft, is solved; instead, in embodiments of the present invention, the brake can adjust automatically in any state; when the brake is in charged state, the clearance formed at the middle position between the two friction plates at the each side of the brake disk is even clearance; therefore, the brake disk will not chafe either friction plate and produce noise; as the result, the life-span of the brake is increased, and the safety of the braking system is enhanced; 3. No readjustment is required in any case once the brake is installed and adjusted; therefore, the maintenance and service labor is minimized.

Figure 1:
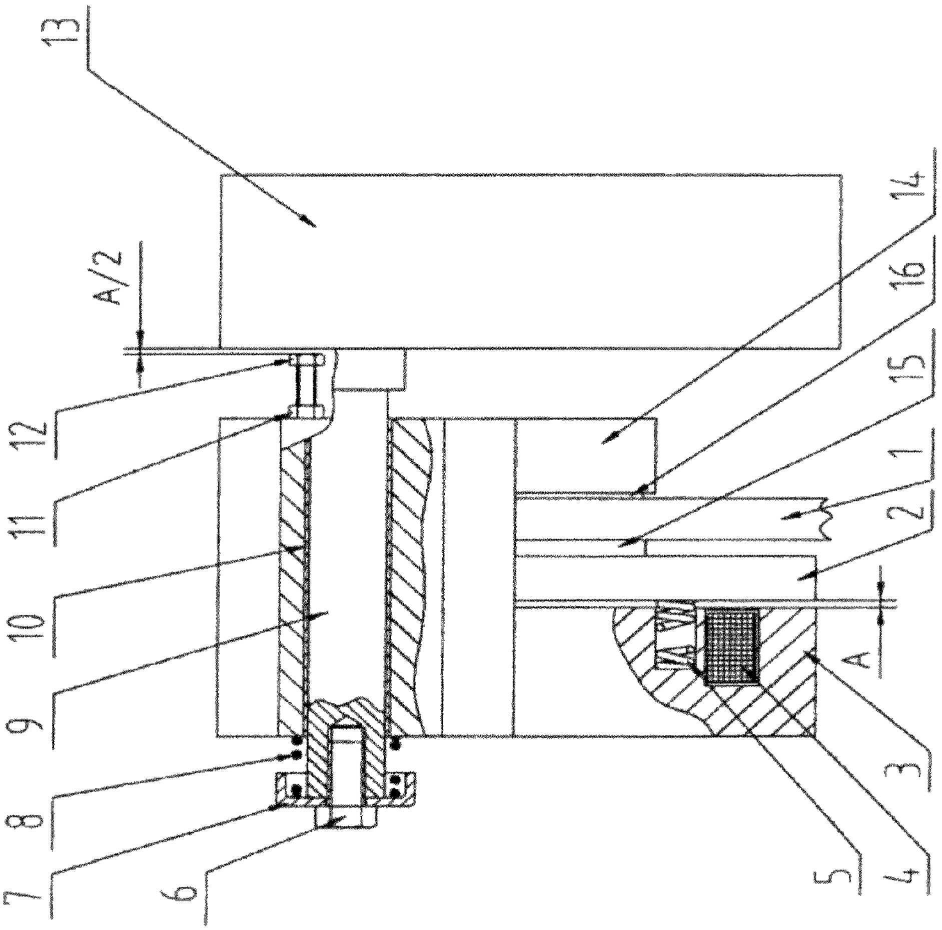
Fig. 1 (Prior Art)
FIG. 1 is a schematic structural representation of the disk brake in braking state in the prior art.
Figure 2:
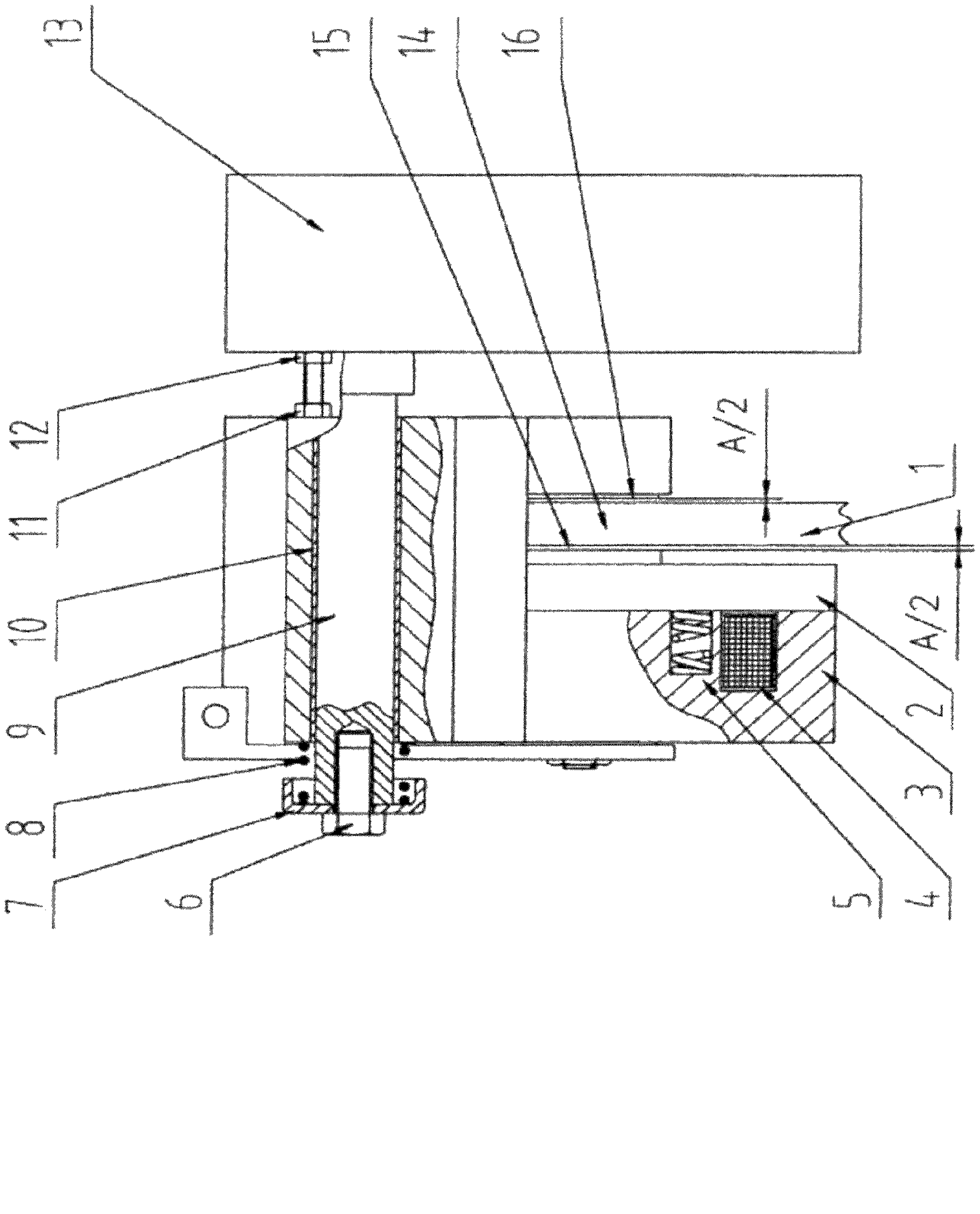
Fig. 2 (Prior Art)
FIG. 2 is a schematic structural representation of the disk brake in released state in the prior art.
Figure 3:
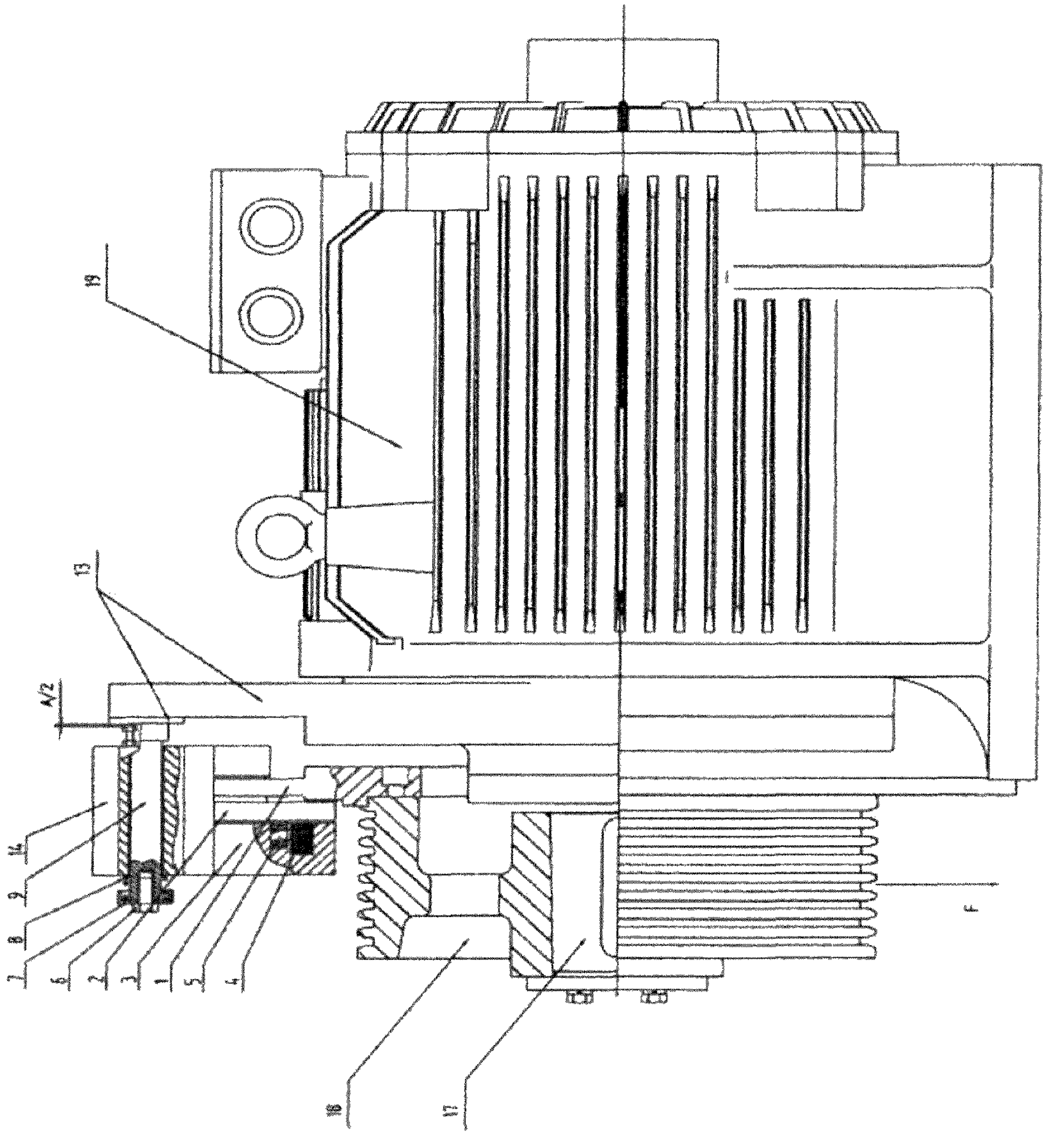
Fig. 3 (Prior Art)
FIG. 3 is a schematic reference diagram of working state of the disk brake mounted on a traction machine in the prior art.

In the figures, the following is a brief description of reference numerals indicating elements in the figures:

1. brake disk, 2. moving disk, 3. fixed disk, 4. brake coil, 5. brake spring, 6. bolt, 7. spring bulkhead, 8. small spring, 9. guide rod, 10. sleeve, 11. first locknut, 12. adjusting bolt, 13. mounting base, 14. brake calipers, 15. left friction plate, 16. right friction plate, 17. main shaft, 18. traction wheel, 19. front cover, 20. fixed plate, 21. first screw, 22. second locknut, 23. first lever, 23*a*. second lever, 24. fixed rod, 25. shaft hole, 26. first spring clamp, 26*a*. second spring clamp, 27. second screw, 28. cambered boss.

DETAILED DESCRIPTION OF THE EMBODIMENTS

To make the present invention understood better and further embody the beneficial effects of the present invention, hereunder the present invention will be described in the embodiments; however, such embodiments shall not be deemed as any limitation to the technical scheme of the present invention.

Embodiment 1

Figure 4:
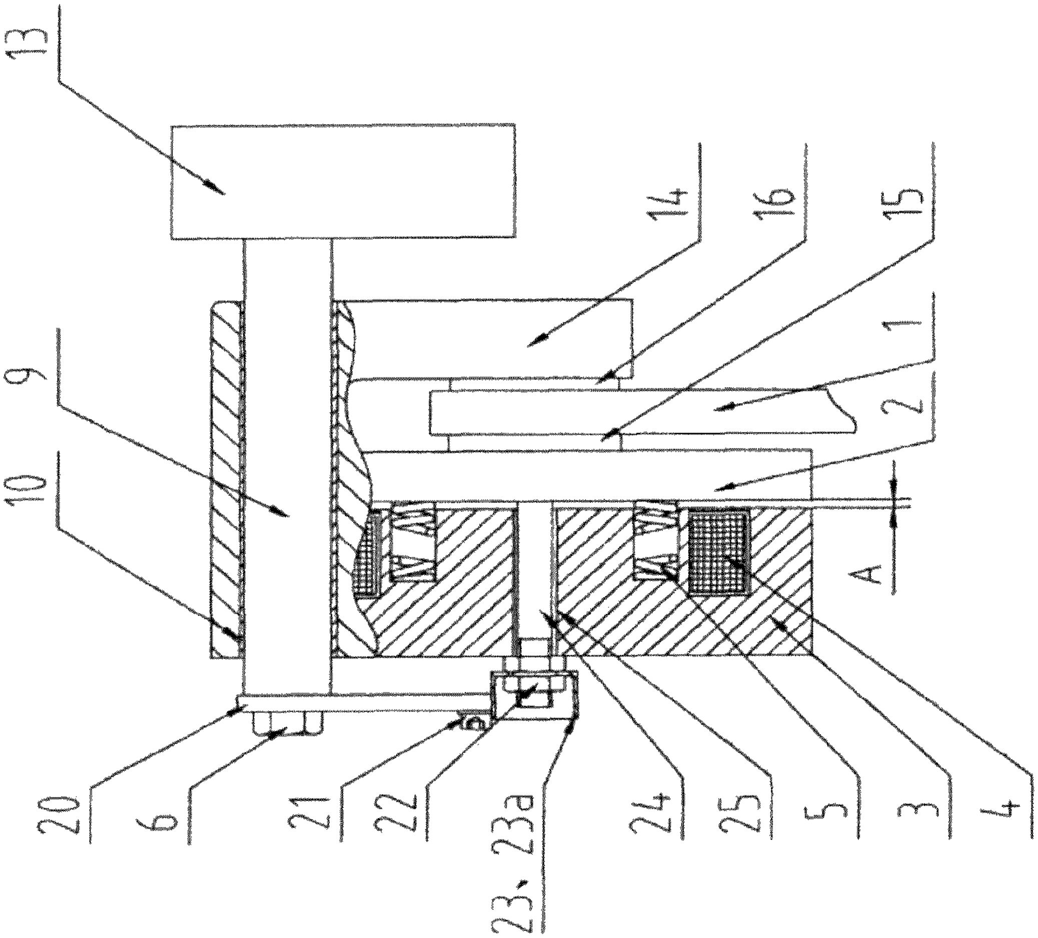
FIG. 4 is a schematic structural diagram of a disk brake according to an embodiment of the present invention.
Figure 5:
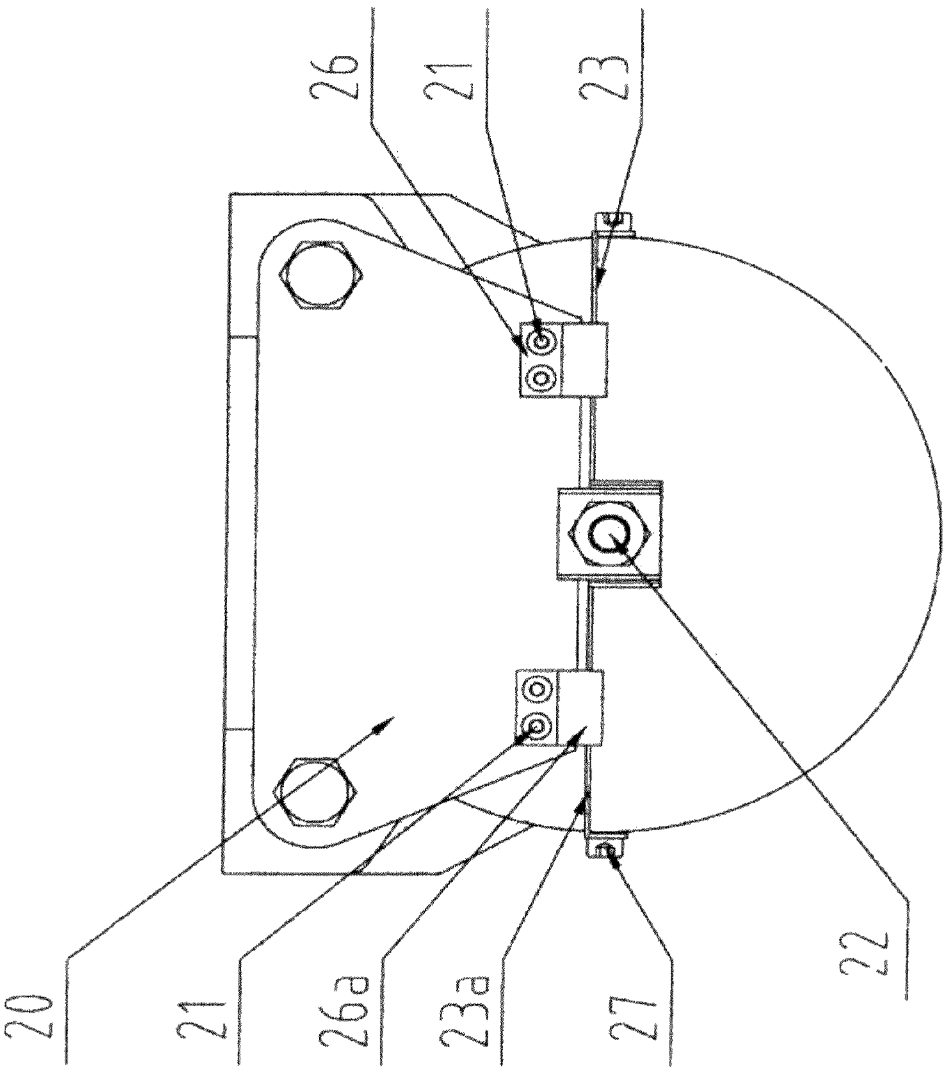
FIG. 5 is a left view of the disk brake of FIG. 4.
Figure 6:
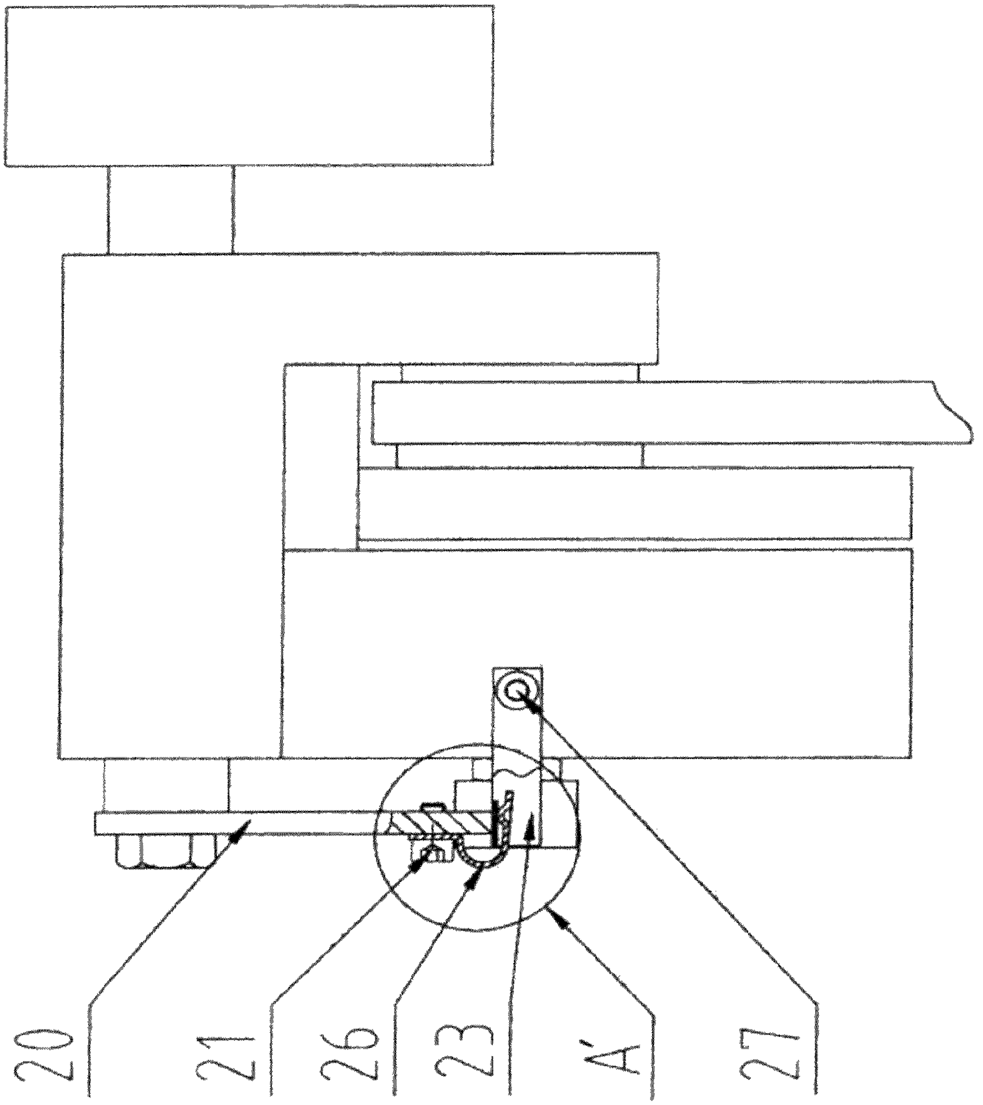
FIG. 6 is a structural representation of the fixed plate, levers, and spring clamps mounted on the brake in the present invention.
Figure 7:
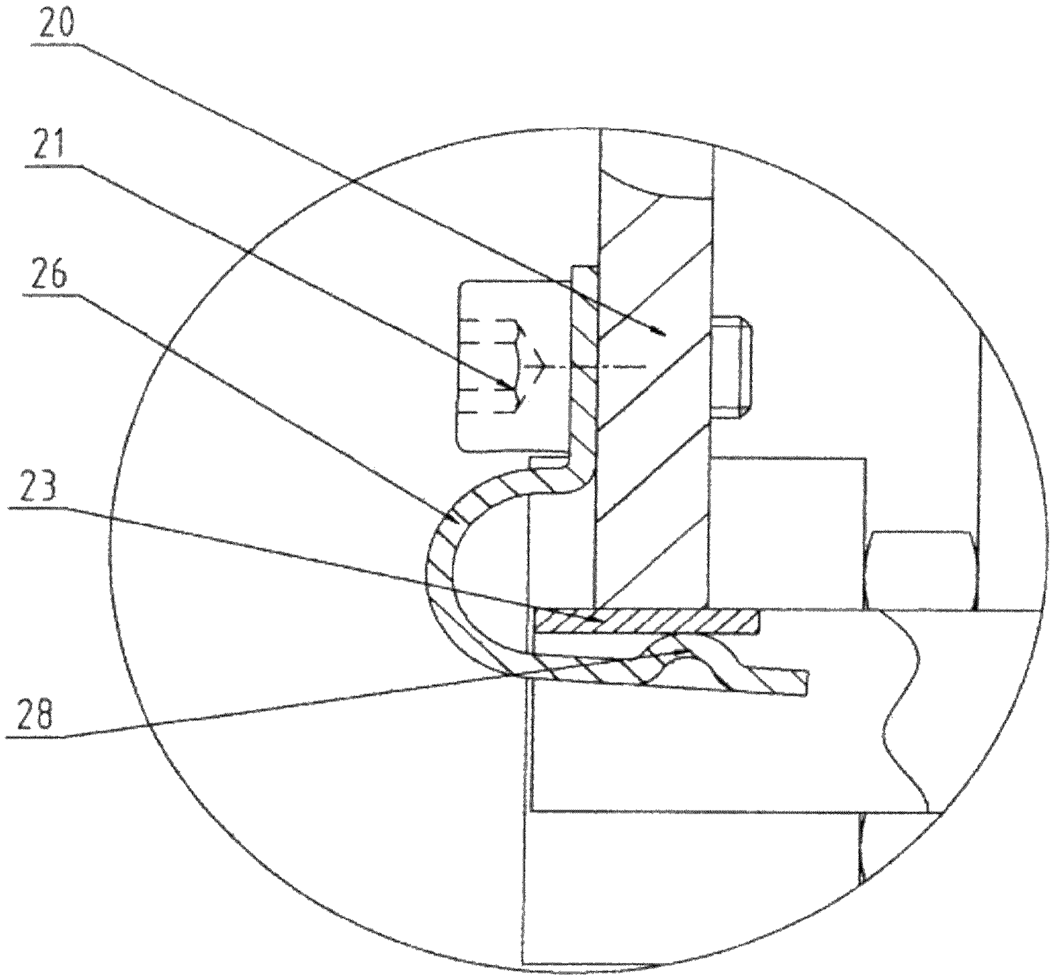
FIG. 7 is an enlarged view of part A' in FIG. 6.

Please refer to FIG. 4, FIG. 5, and in combination with FIG. 6, FIG. 7. As shown in the Figures, the disk brake comprises a brake disk (1), a moving disk (2), a fixed disk (3), a brake coil (4), a brake spring (5), left and right friction plates (15, 16), a bolt (6), a guide rod (9), a sleeve (10), a mounting base (13), a brake caliper (14), a fixed rod (24), a first lever and a second lever (23, 23*a*), a first spring clamp and a second spring clamp (26, 26*a*), and a fixed plate (20), wherein, the moving disk (2) and fixed disk (3) are in disk shape, the brake coil (4) and brake spring (5) are arranged in the fixed disk (3), the brake calipers (14) and the fixed disk (3) are fixed together with screws; the left friction plate (15) is adhered to the inner side of the moving disk (2), the right friction plate (16) is adhered to the inner side of the brake calipers (14), and the left and right friction plates (15, 16) are used to clamp the brake disk (1); a mounting hole is opened on the brake calipers (14), the sleeve (10) is arranged in the mounting hole, and the guide rod (9) is inserted in the sleeve (10) and is mounted on the mounting base (13); one end of the fixed rod (24) is fixed to the central position of the disk plane of the moving disk (2) through welded or screwed connection, and the other end of the fixed rod (24) passes through the a center shaft hole (25) of the fixed disk (3) and is fixed with two locknuts aligned side by side (as shown in FIG. 4), i.e., the second locknut (22) fixes one end of the first/second lever (23, 23*a*), and forms a working clearance A between the moving disk (2) and the fixed disk (3); the other end of the first/second lever (23, 23*a*) is fixed by the second screw (27) on the circumferential surface of the fixed disk (3) on the center line of the fixed disk (3), and is aligned in symmetry in left-right direction (as shown in FIG. 5); the fixed plate (20) is fixed to the front end of the guide rod (9) with bolt (6); the first and second spring clamps (26, 26*a*) are clamped in the middle of the first and second levers (23, 23*a*) respectively, and are mounted on the fixed plate (20). Specifically, a cambered boss (28) is formed on the first/second spring clamp (26, 26*a*) respectively, one end of the first/second spring clamp (26, 26*a*) is fixed to the fixed plate (20) with the first screw (21) respectively, and the other end of the first/second spring clamp (26, 26*a*) is clamped on the first/second lever (23, 23*a*) via the cambered boss (28), respectively. In addition, the brake is configured in a way that the friction force between the cambered boss (28) and the first/second lever (23, 23*a*) is greater than the axial sliding resistance on the guide rod (9) when the brake slides on the guide rod (9), but is much smaller than the force required to change the axial position of the brake disk (1). The first and second levers (23, 23*a*) can be fabricated into an integral structure or fabricated into separate parts; in case of integral structure, the ends at the middle position of the first and second levers (23, 23*a*) are connected together (as shown in FIG. 5).

Embodiment 2

Compared to the embodiment 1, the difference of this embodiment lies in: the fixed rod (24) comprises two rods, the fixed plate (20) comprises two plates, and the first and second levers (23, 23*a*) are two parts fabricated separately. Specifically, one end of the two fixed rods (24) is fixed to the disk plane of the moving disk (2) respectively, and the other end of the two fixed rods (24) passes through the fixed disk (3) and is fixed to one end of the first and second levers (23, 23*a*) that are fabricated into separate parts, respectively; the two fixed plates (20) are fixed to the extension end of the mounting base (13) with fasteners, and one end of the first/second spring clamp (26, 26*a*) is connected to the corresponding fixed plate (20) respectively with fasteners. The other elements of this embodiment is identical to that of the embodiment 1.

Example of Application:

When the brake is in a braking state, the bending deflection of the main shaft varies with the load, and the axial position of the brake disk (1) varies with the bending deflection of the main shaft, and forces relative displacement between the brake and the guide rod (9) (no axial displacement occurs, because the guide rod (9) is fixed to the mounting base (13), and the mounting base (13) is fixed to the front cover of the traction machine); whereas, the fixed plate (20) is fixed to the guide rod (9), and does not move when the first and second levers (23, 23*a*) move with the brake (because the guide rod (9) has no axial displacement); since the friction force caused by the cambered boss (28) clamping first/second lever (23, 23*a*) is much smaller than the force required to change the axial position of the brake disk (1), the cambered boss (28) on the first/second spring clamp (26, 26*a*) has axial displacement and forms a new clamping position.

When the brake coil (4) is charged, a magnetic circuit is formed between the moving disk (2), fixed disk (3), and working clearance A, and electromagnetic force is produced; the moving disk (2) moves towards the fixed disk (3) under the attractive electromagnetic force; meanwhile, the fixed rod (24) pushes one end of the first/second lever (23, 23*a*) outwards; for the first and second levers (23, 23A), since the middle position is clamped by the cambered boss 28 on the first/second spring clamp (26, 26*a*) and the friction force caused by the cambered boss (28) clamping the first/second lever (23, 23*a*) is greater than the axial sliding resistance on the brake when the brakes slide on the guide rod (9), according to the lever principle, the other end of the first/second lever (23, 23*a*) will move the same distance in the reverse direction; since one end of the first/second lever (23, 23*a*) is connected to the moving disk (2) via the fixed rod (24) respectively and the other end of the first/second lever (23, 23*a*) is connected to the circumferential surface of the fixed disk (3) on the center line of the fixed disk (3), therefore, the moving disk (2) and fixed disk (3) move the same distance relative to the axial position of the brake disk (1); finally, the total clearance A is allocated evenly, and a self-adjustment effect is attained.

In view of the foregoing, a disk brake according to an embodiment of the present invention can adjust automatically and allocate the clearance evenly in any state, and therefore enhances the safety of the braking system and brings maintenance and service convenience.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A disk brake comprising: a brake disk (1), a moving disk (2), a fixed disk (3), a brake coil (4) and a brake spring (5) arranged in the fixed disk (3), a brake calipers (14) fixed to the fixed disk (3), a left friction plate (15) adhered to a side of the moving disk (2) facing the brake disk (1), a right friction plate (16) adhered to a side of the brake calipers (14) facing the brake disk (1); a mounting base (13) designed to fix to a traction machine, a guide rod (9) inserted in a mounting hole on the brake caliper (14) and fixed to the mounting base (13); wherein, the disk brake further comprises a fixed rod (24), first and second levers (23, 23*a*), a fixed plate (20), and first and second spring clamps (26, 26*a*); one end of the fixed rod (24) is fixed to a plane of the moving disk (2), and the other end of the fixed rod (24) passes through the fixed disk (3) and is fixed to one end of the first/second lever (23, 23*a*), and forms a working clearance A between the moving and fixed disks (2, 3); the other end of the first/second lever (23, 23*a*) is fixed to a circumferential surface of the fixed disk (3) on the center line of the fixed disk (3), and the fixed plate (20) is fixed to either the guide rod (9) or the mounting base (13); one end of the first/second spring clamp (26, 26*a*) is connected to the fixed plate (20) respectively, and the other end of the first/second spring clamp (26, 26*a*) is clamped at the middle position between the first and second levers (23, 23*a*).

2. The disk brake with an improved structure according to claim 1, wherein, a cambered boss (28) designed to fit tightly with the first/second lever (23, 23*a*) is formed on the other end of the first/second spring clamp (26, 26*a*), respectively.

3. The disk brake with an improved structure according to claim 1, wherein, the first and second levers (23, 23*a*) are fabricated into an integral structure.

4. The disk brake with an improved structure according to claim 3, wherein, the fixed rod (24) comprises one rod, one end of the fixed rod (24) is fixed to the central position of the plane of the moving disk (2), and the other end of the fixed rod (24) passes through a center shaft hole on the fixed disk (3) and is fixed to one end of the first/second lever (23, 23*a*), respectively.

5. The disk brake with an improved structure according to claim 1, wherein, the first and second levers (23, 23*a*) are fabricated into separate parts.

6. The disk brake with an improved structure according to claim 5, wherein, the fixed rod (24) comprises one rod, one end of the fixed rod (24) is fixed to the central position of the plane of the moving disk (2), and the other end of the fixed rod (24) passes through a center shaft hole on the fixed disk (3) and is fixed to one end of the first/second lever (23, 23*a*), respectively.

7. The disk brake with an improved structure according to claim 1, wherein, the fixed rod (24) comprises one rod, one end of the fixed rod (24) is fixed to the central position of the plane of the moving disk (2), and the other end of the fixed rod (24) passes through a center shaft hole on the fixed disk (3) and is fixed to one end of the first/second lever (23, 23*a*), respectively.

8. The disk brake with an improved structure according to claim 1, wherein, the fixed plate (20) comprises one plate fixed to a front end of the guide rods (9) with fasteners.

* * * * *